United States Patent
Kubo et al.

[15] 3,684,066
[45] Aug. 15, 1972

[54] AUTOMATIC SHIFT CONTROL SYSTEM FOR AUTOMATIC TRANSMISSION

[72] Inventors: Seitoku Kubo; Takakazu Mori, both of Toyota; Hisato Wakamatsu, Kariya; Hisasi Kawai, Toyohashi, all of Japan

[73] Assignees: Toyota Jidasha Kogyo Kabushiki Kaisha, Toyotacho, Toyota-shi; Nippondenso Kabushiki Kaisha, Kariya-shi, Aichi-ken, Japan

[22] Filed: Sept. 28, 1970

[21] Appl. No.: 75,837

[30] Foreign Application Priority Data

Oct. 8, 1969 Japan ..................44/80640

[52] U.S. Cl. ..................192/4 A, 74/866
[51] Int. Cl. ..................B60k 21/02, B60k 29/00
[58] Field of Search ......74/866, 752 D; 192/4 R, 4 A

[56] References Cited

UNITED STATES PATENTS

| | | | |
|---|---|---|---|
| 3,439,564 | 4/1969 | Scholl et al. | 74/866 |
| 3,122,940 | 3/1964 | Shimwell et al. | 74/472 |
| 3,267,762 | 8/1966 | Reval | 74/365 |
| 3,448,640 | 6/1969 | Nelson | 74/866 |

Primary Examiner—Carlton R. Croyle
Assistant Examiner—Richard J. Sher
Attorney—Cushman, Darby & Cushman

[57] ABSTRACT

An automatic shift control system for an automatic transmission comprising a mountainous area circuit having an acclivity detecting means, a brake fluid pressure detecting means and a computing means so that the shift pattern can be automatically changed depending on the variation in the driving conditions and the vehicle can run in a mountainous area while preventing the gear from frequently shifting to high gear and maintaining same in low gear.

3 Claims, 18 Drawing Figures

AUTOMATIC SHIFT CONTROL SYSTEM FOR AUTOMATIC TRANSMISSION

This invention relates to improvements in an automatic shift control system for automatic transmissions for vehicles for automatically changing the speed by shifting the gear depending on the vehicle speed and the load on the engine.

In an automatic shift control system employed heretofore in common passenger cars, the shift point is generally determined from a signal representative of the vehicle speed (taken from the output shaft of a multi-speed gear transmission means) or a signal representative of the r.p.m. (revolutions per minute) of the prime mover or engine and a signal representative of the negative pressure (boost pressure) in the air intake pipe of the engine or a signal representative of the amount of depression of the accelerator pedal actuated by the driver. A commonly employed method comprises obtaining these signals in the form of a high and a low fluid pressure, determining the shift point on the basis of the interrelation between these two fluid pressures, and opening and closing related valves for selectively hydraulically operating an actuator such as a multiple disc clutch and a brake band for shifting the gears in the multi-speed gear transmission means to first, second, third or other gear. Thus, in the conventional automatic shift control system which is wholly controlled by means of fluid pressure, the detected signals in the form of fluid pressures are subjected to errors and are therefore generally inaccurate. This means that the shift point is also frequently subjected to error. Further, the hydraulic actuating circuit is generally complex in structure and it is not an easy matter to impart thereto an improved function over the existing function. Moreover, according to the conventional shift control system in which the shift pattern is primarily adapted for driving on a level road in view of the high frequency of driving on such a road, various difficulties arise when the vehicle is driven on a mountainous road. Suppose, for example, that a vehicle equipped with an automatic transmission enters a mountainous area while driving in high gear, for example, third gear of a relatively low speed range and starts to run up an incline. Since, in this case, the running resistance is increased and the acceleration is gradually decreased, the driver depresses the accelerator pedal to downshift to low gear, for example, second gear thereby increasing the acceleration. However, the release of the force imparted to the accelerator pedal when the vehicle encounters a curve or obstacle causes an upshift to high gear again resulting in an abrupt reduction in the acceleration. The gear must be downshifted to low gear again in order to accelerate the vehicle again. Such a shift between low and high gear occurs frequently during driving on a mountainous road. In the case of driving on a mountainous road, an upshift to high gear should not take place even with a slight release of the force imparted to the accelerator pedal and the vehicle should run in low gear. This is better for the sense of driving and the durability of the transmission. The force imparted to the accelerator pedal is released for the purpose of deceleration when the vehicle encounters a decline, but this results in changing to high gear and no engine braking can therefore be expected. In such a state, it is preferable to maintain the gear in low gear so that the engine braking can be effectively applied.

With a view to eliminating the difficulties encountered heretofore, it is an object of the present invention to provide an improved automatic shift control system according to which the shift pattern for shifting the gear position to suit the driving state of the vehicle can be electrically automatically changed depending on the various driving conditions including driving on a mountainous road and driving on a level road.

Another object of the present invention is to provide, in an automatic transmission for an engine-driven vehicle having a torque converter, a gear unit, frictionally engaging means for accomplishing the selective meshing engagement of the gears in said gear unit, and means for producing ratio changes by actuating said frictionally engaging means, an automatic shift control system comprising at least two shift signal generators for generating a shift signal in response to an electrical signal responsive to the load on the engine represented by, for example, the amount of depression of the accelerator pedal and an electrical signal responsive to the vehicle speed, and a mountainous area circuit for generating and applying a signal to one of said shift signal generators to downshift the gear from high gear, for example, third gear to low gear, for example, second gear during driving the vehicle in high or third gear on a mountainous road, thereby establishing a mountainous area driving condition and maintaining such a condition when the combination of an electrical signal responsive to the load on the engine, an electrical signal responsive to the vehicle speed, an electrical signal responsive to the acceleration of the vehicle body, an electrical signal responsive to the detected brake fluid pressure and an electrical signal responsive to the low gear position satisfies a first predetermined condition, said mountainous area circuit ceasing to generate the signal having been applied to said shift signal generator thereby releasing the mountainous area driving condition when the combination of the electrical signals satisfies a second predetermined condition.

According to the present invention, the vehicle can freely run on a level road as heretofore, and when the vehicle driving in high gear is difficult to run up an incline in a mountainous area, the gear is downshifted to a lower gear and the low gear position is maintained so that the vehicle can run up the incline while fully developing the engine output. When the vehicle subsequently encounters a decline, the low gear position is still maintained so as to apply engine braking. Thus, the trouble of frequent shifting to high gear in a mountainous area can be eliminated and the vehicle can drive on both the mountainous and level roads with an automatic shift in the gear position. Further, by virtue of the provision of the shift signal generators generating a shift signal in response to an electrical signal responsive to the load on the engine and an electrical signal responsive to the vehicle speed for attaining a shift as usual, the shift control system has a very simple structure.

A further object of the present invention is to provide an automatic shift control system for an automatic transmission of the above character, in which said mountainous area circuit comprises a first throttle position discriminating circuit for generating a signal when the value of the electrical signal responsive to the load on the engine represented by the amount of depression of the accelerator pedal is larger than a predetermined setting, a first vehicle speed discriminating circuit for generating a signal when the value of the electrical signal responsive to the vehicle speed is smaller than a predetermined setting, a vehicle body acceleration discriminating circuit for generating a signal when the value of the vehicle body acceleration responsive signal obtained by differentiating the vehicle speed responsive signal is smaller than a predetermined setting, a time circuit for generating a signal when the signal delivered from said acceleration discriminating circuit continues to appear for more than a predetermined period of time, a first AND circuit for generating a signal upon receiving all of the signals delivered from said first throttle position discriminating circuit, from said first vehicle speed discriminating circuit and from said time circuit, a brake fluid pressure detecting circuit for generating a signal when the fluid pressure applied to the vehicle's brake satisfies a predetermined condition, a first OR circuit for generating a signal upon receiving at least one of the signals delivered from said first AND circuit and from said brake fluid pressure detecting circuit, a bistable memory circuit which is placed in one of the stable states upon receiving the signal delivered from said first OR circuit thereby continuing to generate a signal, a second throttle position discriminating circuit for generating a signal when the value of the electrical signal responsive to the load on the engine represented by the amount of depression of the accelerator pedal is larger than another predetermined setting, a second vehicle speed discriminating circuit for generating a signal when the value of the electrical signal responsive to the vehicle speed is larger than another predetermined setting, a second AND circuit for generating a signal upon receiving both of the signal delivered from said second throttle position discriminating circuit and from said second vehicle speed discriminating circuit, and a second OR circuit for generating a signal upon receiving at least one of the signal delivered from said second AND circuit and the low gear position responsive signal delivered from one of said shift signal generators thereby urging said bistable memory circuit into the other stable state so that said bistable memory circuit ceases to generate the signal.

According to the present invention, the gear is shifted from high to low gear when the throttle opening, vehicle speed, vehicle body acceleration and duration of the signal delivered from the acceleration discriminating circuit satisfy temporarily the respective predetermined conditions during driving the vehicle in high gear and also when the brake fluid pressure resulting from the depression of the brake pedal temporarily exceeds the predetermined setting during driving the vehicle in high gear. Thus, the driving force imparted to the vehicle running up the incline can be increased to accelerate the vehicle with the full engine output, while due to the shifting of the gear from high to low gear, the engine braking can be effectively applied to the vehicle descending the decline. When, on the other hand, the throttle opening and speed of the vehicle driven in low gear satisfy the conditions different from those mentioned above, the bistable memory circuit ceases to generate signals so that the vehicle can be driven as usual. Further, due to the fact that the mountainous area circuit includes logic circuits, the system is free from any malfunctioning and has a simple structure compared with the prior art system employing a hydraulic circuit or relays.

A still further object of the present invention is to provide an automatic shift control system for an automatic transmission of the above character in which said first throttle position discriminating circuit in said mountainous area circuit is so constructed that it generates a signal when the value of the electrical signal responsive to the load on the engine represented by the amount of depression of the accelerator pedal continues to be larger than the predetermined setting for more than a predetermined period of time.

According to the present invention, even when the conditions appearing during driving on an incline may be temporarily satisfied due to an advertent manipulation such that the accelerator pedal is abruptly depressed and then immediately released to cause chattering during driving of the vehicle at a constant speed in high gear on a level road, no signal is delivered from the first AND circuit thereby preventing the gear from being downshifted to low gear. Thus, the danger due to such an undesirable shift can be eliminated and the vehicle can run safely on any road.

The above and other objects, features and advantages of the present invention will be apparent from the following detailed description taken in conjunction with the accompanying drawings, in which:

FIGS. 3 through 5 are diagrammatic views illustrating the operating state at various positions of a hydraulic actuating circuit employed in the present invention, wherein FIG. 3 illustrates the operating state at the D position-1st speed, FIG. 4 the operating state at the D position-2nd speed, and FIG. 5 the operating state at the D position-3rd speed;

Figure 1:
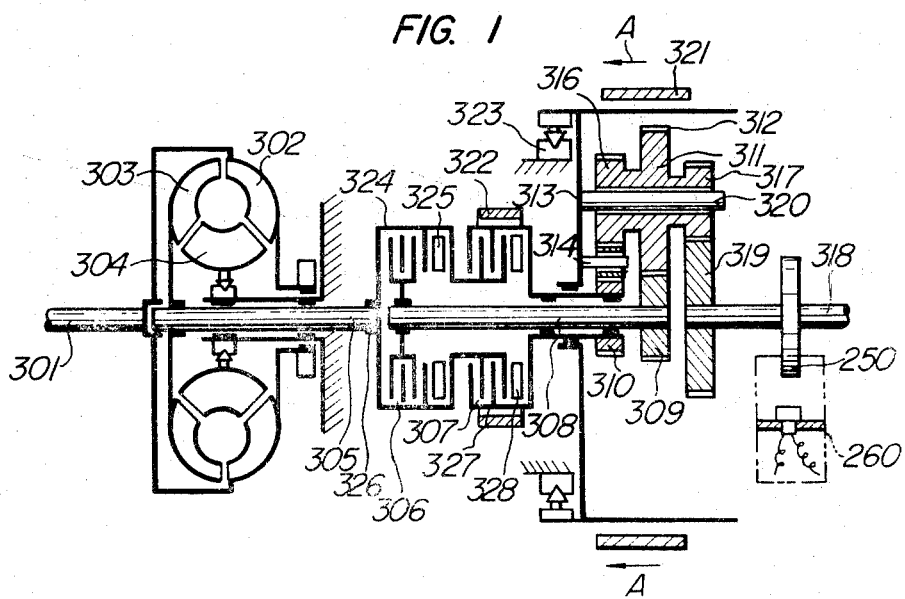
FIG. 1 is a schematic sectional view of an automatic transmission to which the present invention is applied.

A torque converter automatic transmission having three forward speeds and one reverse speed as shown in FIG. 1 will be taken as a typical example of the automatic transmission. In FIG. 1, the structure of such a fluid controlled automatic transmission is schematically shown.

A torque converter unit includes a pump impeller 302 directly connected to a crankshaft 301 of an engine. The power developed by the engine is transmitted from the pump impeller 302 to a turbine impeller 303 through the medium of a hydraulic fluid, and the fluid is returned to enter the pump impeller 302 again by being guided by a stator 304. A rotational force can be continuously derived from a turbine shaft 305 by the repetition of the above flow of the fluid. This rotational force is transmitted from the turbine shaft 305 to a gear unit disposed at the output side of the torque converter unit. As is commonly known, multiple disc clutch means 306 and 307 and brake band means 321 and 322 are automatically controlled by fluid pressure supplied from associated servo means as required and cooperate with a planetary gear mechanism to provide three forward speeds and one reverse speed.

The structure of the gear unit disposed at the output side of the torque converter unit will now be described. The turbine impeller 303 is connected to the turbine shaft 305 which acts as a power input shaft of the planetary gear mechanism. The turbine shaft 305 is splined to a drum 324 for unitary rotation therewith. Disposed within the drum 324 is a multiple disc clutch 306 (hereinafter to be referred to as a front clutch) which is engaged by means of a piston 325 actuated by fluid pressure and is released by means of back-up springs. The drive plates of the front clutch 306 are externally splined to engage the internally splined portion of the drum 324, and the clutch discs are internally splined to engage the externally splined portion of a hub 326 so as to be locked against free rotation. The hub 326 is internally splined to engage the externally splined portion of an intermediate shaft 308. The clutch discs of a multiple disc clutch 307 (hereinafter to be referred to as a rear clutch) are internally splined to engage the externally splined portion of the front clutch drum 324 as shown so as to be locked against free rotation. Thus, the clutch discs of the rear clutch 307 rotate in unison with the front clutch drum 324. The driven plates of the rear clutch 307 are externally splined to engage the internally splined portion of a clutch drum 327 of the rear clutch 307. The rear clutch 307 is engaged by means of a fluid pressure actuated piston 328 and disengaged when fluid pressure applied to the piston 328 is released.

Figure 2:
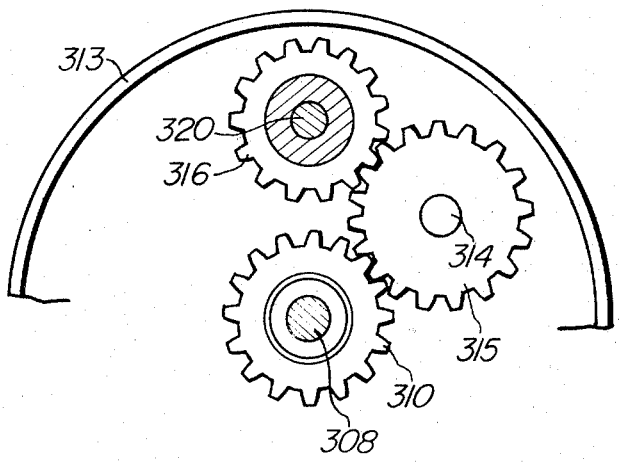
FIG. 2 is an enlarged sectional view taken on the line A—A in FIG. 1 with parts cut away to show in detail the relation between an idler gear not shown in FIG. 1 and the sun gear and planet pinion.

The intermediate shaft 308 which is splined to the hub 326 of the front clutch 306 is connected at its rear end to an input sun gear 309. The rear clutch drum 327 is fixed to a reverse sun gear 310 by a suitable locking means. The input sun gear 309 meshes with each gear 312 of a plurality of, for example, two or three planet pinions 311. The reverse sun gear 310 meshes with idler gears 315 (shown in FIG. 2) which are each rotatably mounted on a pin 314 fixed at one end to a carrier 313, and the idler gears 315 in turn mesh with gears 316 of the planet pinions 311.

The rearmost gear 317 of each planet pinion 311 meshes with a gear 319 mounted at the front end of an output shaft 318 of the transmission. The planet pinions 311 having the gears 316, 312 and 317 and the idler gears or pinions 315 are carried by the carrier 313 by means of pinion pins 320 and 314, respectively. A brake band 321 (hereinafter to be referred to as a rear brake band) encircles the carrier 313 for applying a brake to the latter, and thus the carrier 313 can be fixed against rotation and allowed to freely rotate by fastening and releasing the rear brake band 321. Similarly, a brake band 322 (hereinafter to be referred to as a front brake band) encircles the rear clutch drum 327 so that the rear clutch drum 327, hence the sun gear 310 can be fixed against rotation and allowed to freely rotate by fastening and releasing the front brake band 322. A one-way clutch 323 associated with the carrier 313 functions in a manner similar to the rear brake band 321 in low gear set forth hereunder.

With the above structure, three forward speeds and one reverse speed can be obtained by selectively actuating the elements in a manner as follows:

First Speed

The front clutch 306 and the rear brake band 321 are actuated. (However, when the transmission is driven from the engine, the rear brake band 321 may not be actuated since the one-way clutch 323 is actuated to give the same result as that obtained with the actuation of the rear brake band 321. In this case, however, no driving force is transmitted from the output shaft 318 to the engine.) With the front clutch 306 and the rear brake band 321 so actuated, the rotation of the turbine shaft 305 is directly transmitted to the input sun gear 309 through the front clutch 306. Due to the fact that the carrier 313 is locked against rotation by the rear brake band 321, the pinion pins 320 are also held stationary and the rotation of the turbine shaft 305 is transmitted from the gear 309 to the gears 312, thence through the gears 317 to the gear 319 on the output shaft 318 in a speed reducing relation similar to that of an ordinary gear train, thereby providing the first speed.

Second Speed

The front clutch 306 is kept actuated and the front brake band 322 is actuated while releasing the rear brake band 321. Thus, the input sun gear 309 is rotated in unison with the turbine shaft 305, but the rear clutch drum 327, hence the reverse sun gear 310 is locked against rotation by the front brake band 322. In this state, the rotation of the turbine shaft 305 is directly transmitted to the input sun gear 309, and the sun gear 309 urges the pinions 311 to rotate in a direction (counter-clockwise) opposite to the direction of rotation (clockwise) of the turbine shaft 305. The planet pinions 311 rotating in this direction try to rotate the idler gears 315 clockwise through the gears 316. However, due to the fact that the gear 310 meshing with the gears 315 is locked against rotation, the pinion pins 314 revolve clockwise around the gear 310. This revolving motion is imparted to the rotation of the input sun gear 309 and the gear 319 carried by the output shaft 318 which gears are coaxial with and rotate in the same direction as the turbine shaft 305. Since the number of teeth of the gear 312 is selected to be greater than the number of teeth of the gear 317, the number of revolutions of the intermediate shaft 308 is greater than that of the output shaft 318. In other words, the output shaft 318 is rotated at a reduced speed or second speed.

Third Speed

The third speed can be obtained by engaging both the front and rear clutches 306 and 307. The input sun gear 309 and the reverse sun gear 310 are rotated in unison and the whole planetary gear system is unitarily rotated so that the output shaft 318 is rotated at the rotating speed of the turbine shaft 305.

Reverse

When reversing, the rear clutch 307 and the rear brake band 321 are actuated. The carrier 313, hence the pinion pins 314 and 320 are thereby locked against revolution, and the rotation of the turbine shaft 305 is transmitted through the rear clutch 307 to the reverse sun gear 310, thence through the pinions 315 and 317 to the gear 319 mounted on the output shaft 318 so that the output shaft 318 is rotated in the reverse direction.

Figure 3:
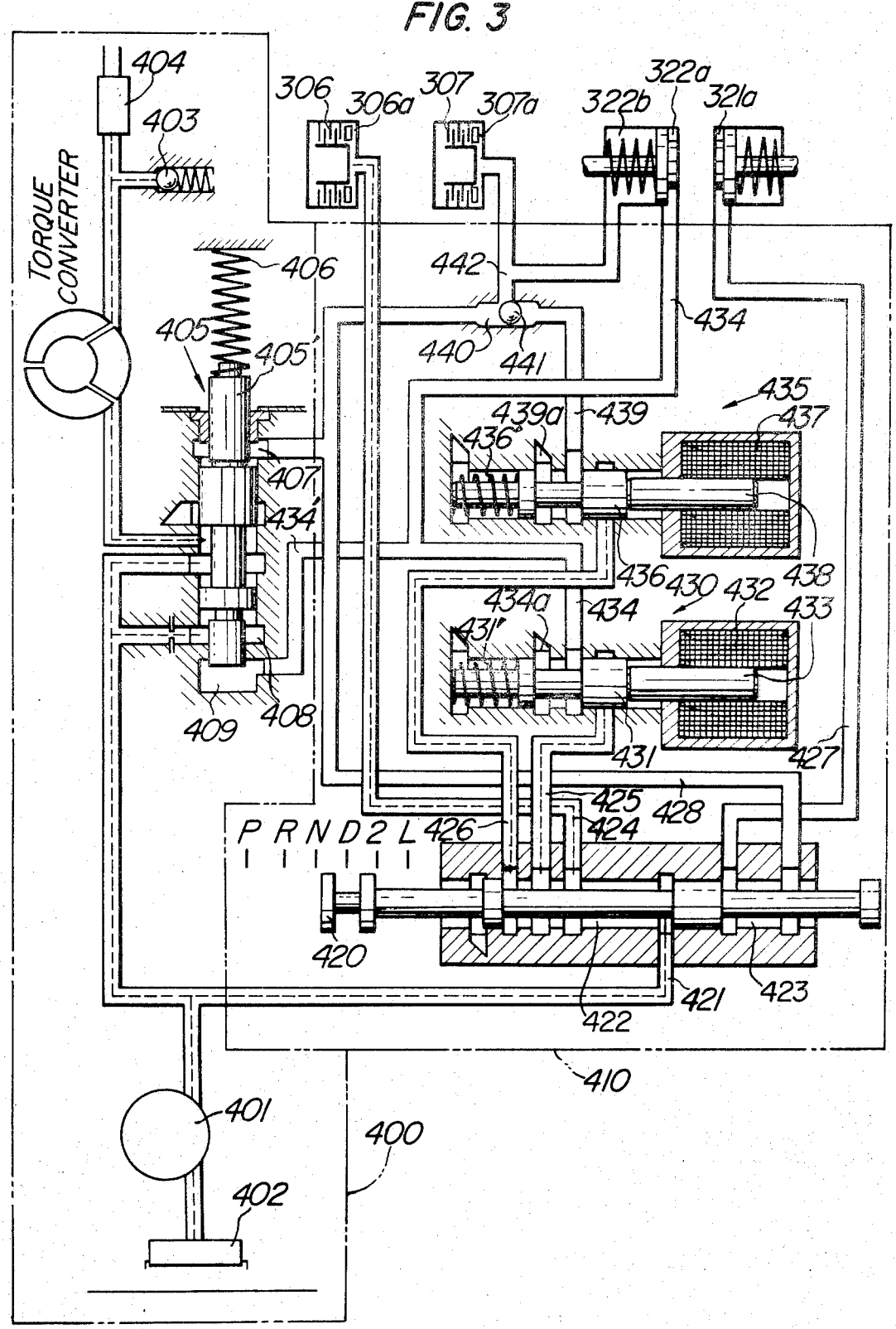
Figure 4:
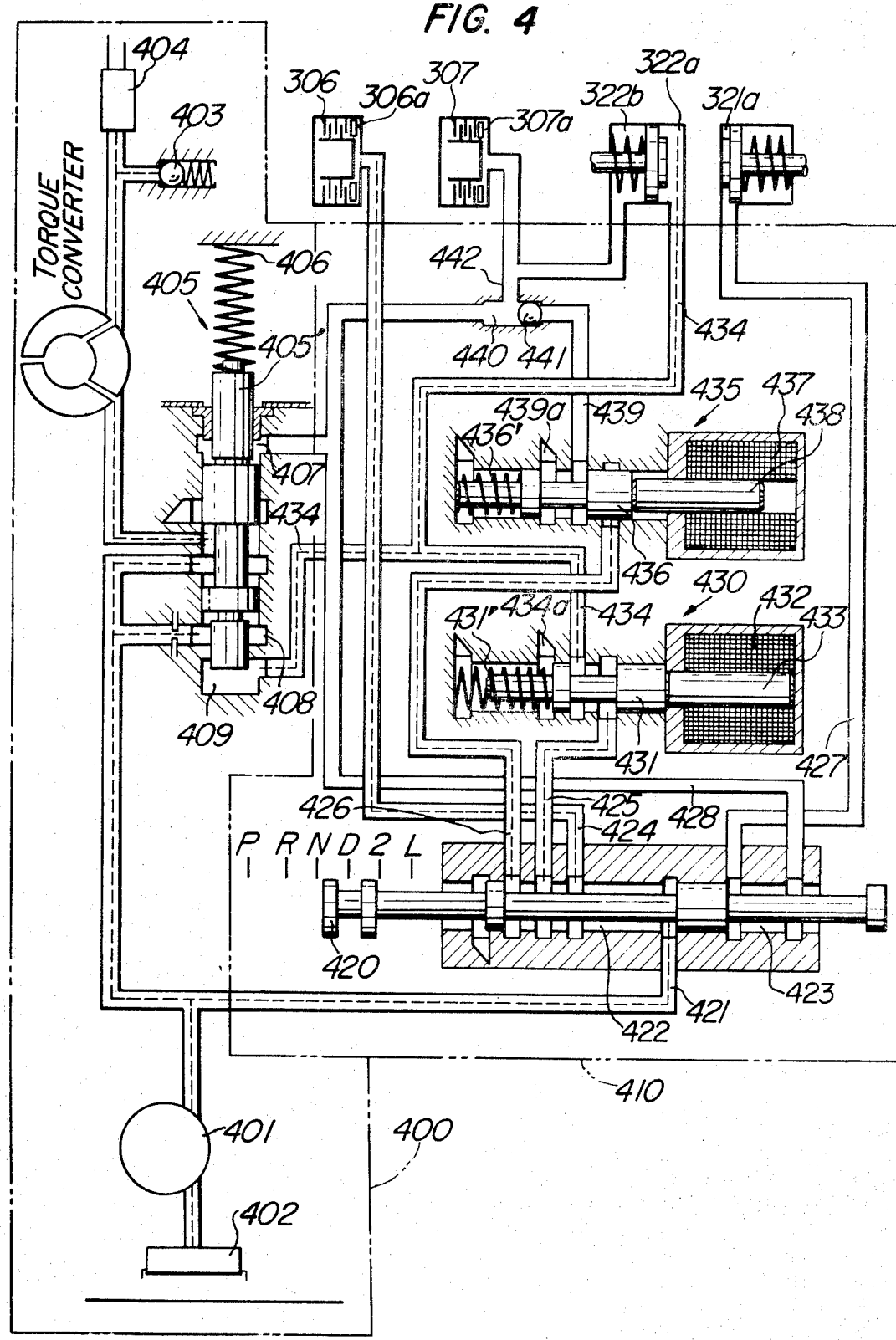
Figure 5:
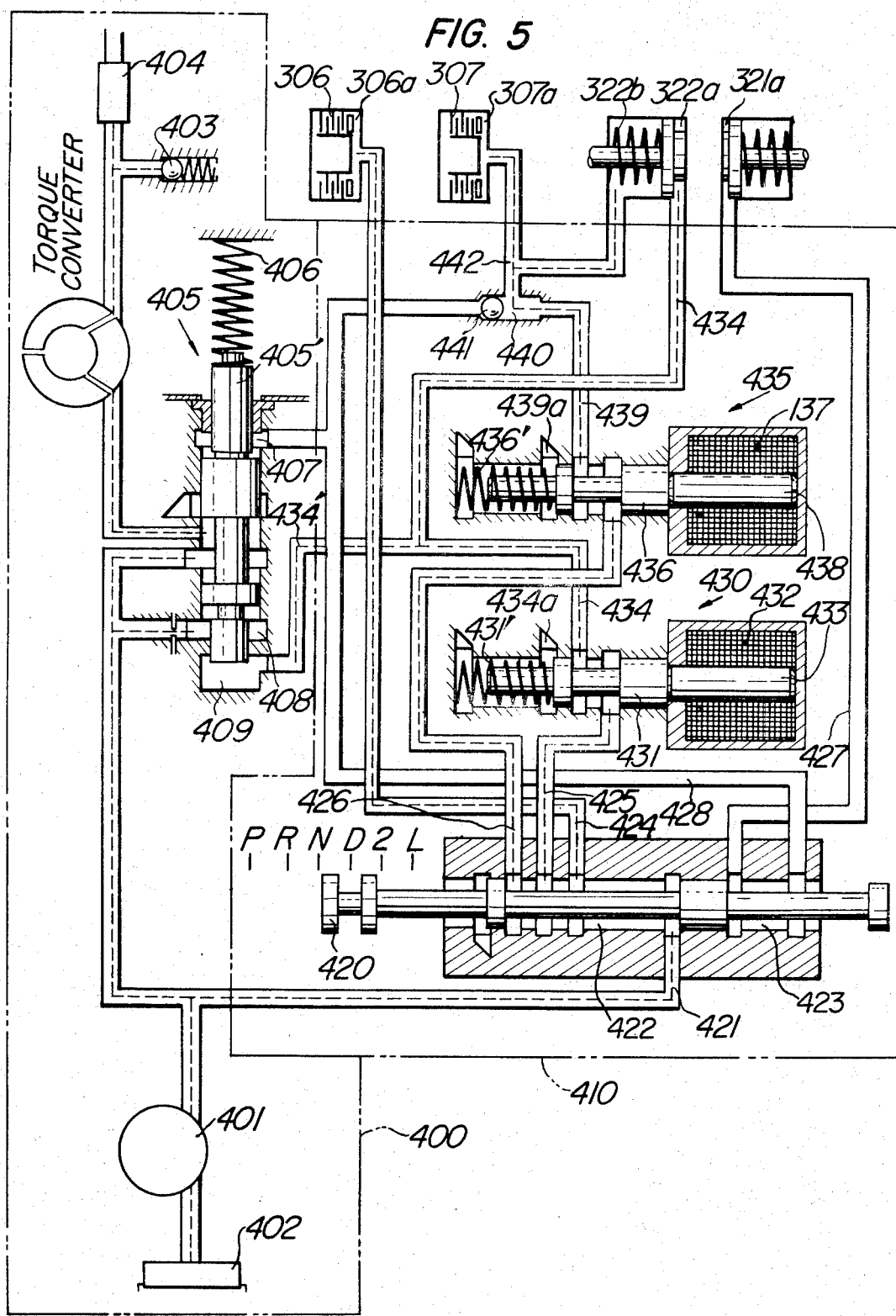

The arrangement of a hydraulic actuating system used in the automatic transmission according to the present invention is shown diagrammatically in FIGS. 3 through 5. Briefly, the hydraulic actuating system comprises a fluid pressure source 400 and a hydraulic actuating circuit 410. The hydraulic actuating circuit 410 includes a manual valve 420, a 1–2 shift means 430, a 2–3 shift means 435, a check valve 440 and fluid passages. The fluid pressure source 400 includes an oil pump 401, an oil strainer 402, a pressure regulator valve 405, a check valve 403, and oil cooler 404 and fluid passages. The fluid pressure source 400 functions to supply fluid under pressure to the torque converter, to the gears for lubricating same and to the hydraulic actuating circuit 410.

The manual valve 420 is connected with a shift lever (not shown) disposed adjacent to the driver's seat and takes one of the P, R, N, D, 2 and L positions. When now the manual valve 420 takes the N position, a fluid passage 421 is closed and valve chambers 422 and 423 are exhausted. At the D position of the manual valve 420, the fluid passage 421 communicates with fluid passages 424, 425 and 426 as seen in FIGS. 3 through 5. The fluid passage 424 leads directly to a front clutch servo chamber 306a, and the fluid passage 425 leads to the apply side 322a of a servo for the front brake band 322 through the 1–2 shift means 430 when a solenoid 432 is energized, while the fluid passage 426 leads to a rear clutch servo chamber 307a and to the release side 322b of the servo for the front brake band 322 through the 2–3 shift means 435 and the check valve 440 when a solenoid 437 is energized. The 1–2 shift means 430 includes a 1–2 shift valve element 431 and the solenoid 432. One end (or the right-hand end as viewed from the drawing) of the valve element 431 is engaged by a moving core 433 of the solenoid 432. When no current is supplied to the solenoid 432, the valve element 431 is urged to its leftward position by a spring 431' engaging the other or left-hand end of the valve element 431 so that the communication between fluid passages 425 and 434 is interrupted and the fluid passage 434 communicates with a pressure discharge port 434a to release the front brake band 322. When current is supplied to the solenoid 432, the moving core 433 urges the valve element 431 to the rightward position by being actuated by the electromagnetic force of the solenoid 432 so that the fluid passage 425 communicates with a fluid passage 434 to supply fluid to the apply side 322a of the servo for the front brake band 322 to apply the front brake band 322. Similarly, the 2–3 shift means 435 includes a 2–3 shift valve element 436 and the solenoid 437. One end (or the right-hand end as viewed from the drawing) of the valve element 436 is engaged by a moving core 438 of the solenoid 437. When no current is supplied to the solenoid 437, the valve element 436 is urged to its leftward position by a spring 436' engaging the other or left-hand end of the valve element 436 so that the communication between the fluid passages 426 and 439 is interrupted and the fluid passage 439 communicates with a pressure discharge port 439a to be exhausted. When current is supplied to the solenoid 437, the valve element 436 is urged rightward so that the fluid passage 426 communicates with a fluid passage 439 to force a check ball element 441 of the check valve 440 toward the fluid passage 428 to block the fluid passage 428. As a result, the fluid passage 439 communicates with a fluid passage 442 to supply fluid to the rear clutch servo chamber 307a and to the release side 322b of the servo for the front brake band 322b of the servo for the front brake band 322 so as to engage the rear clutch 307 and release the front brake band 322.

In the first speed at the drive range position or D position-1st speed shown in FIG. 3, both the solenoids 432 and 437 are de-energized and the front clutch 306 is solely engaged by the fluid supplied to the front clutch servo chamber 306a through the fluid passage 424. Accordingly, when the transmission is driven from the engine, the one-way clutch 323 is engaged to lock the carrier 313 against rotation so that the first speed can be obtained. In this case, however, no driving force can be transmitted from the output shaft 318 to the engine since a freewheeling condition appears.

In the second speed at the drive range position or D position-2nd speed shown in FIG. 4, the fluid passage 424 leading to the front clutch servo chamber 306a is kept pressurized and the solenoid 432 for the 1–2 shift valve element 431 is energized with the result that the fluid passage 425 communicates with the fluid passage 434 to supply fluid to the apply side 322a of the servo for the front brake band 322 to apply the front brake band 322. Thus, the second speed can be obtained.

In the third speed at the drive range position or D position-3rd speed shown in FIG. 5, the solenoid 437 for the 2–3 shift valve element 436 is energized in addition to the previous energization of the solenoid 432 in the D position-2nd speed with the result that the fluid passage 426 communicates with the fluid passage 439 to supply fluid to the rear clutch servo chamber 307a to engage the rear clutch 307 while releasing the front brake band 322. Thus, the third speed can be obtained.

Referring to FIG. 1 again, a toothed disc 250 of magnetic material is secured at its center of rotation to the output shaft 318, and an r.p.m. detector 260 is disposed at a position closely adjacent to the toothed disc 250 in a direction which is diametrically opposite to the latter. The r.p.m. detector 260 is composed of a permanent magnet and a coil wound around the permanent magnet.

Figure 6:
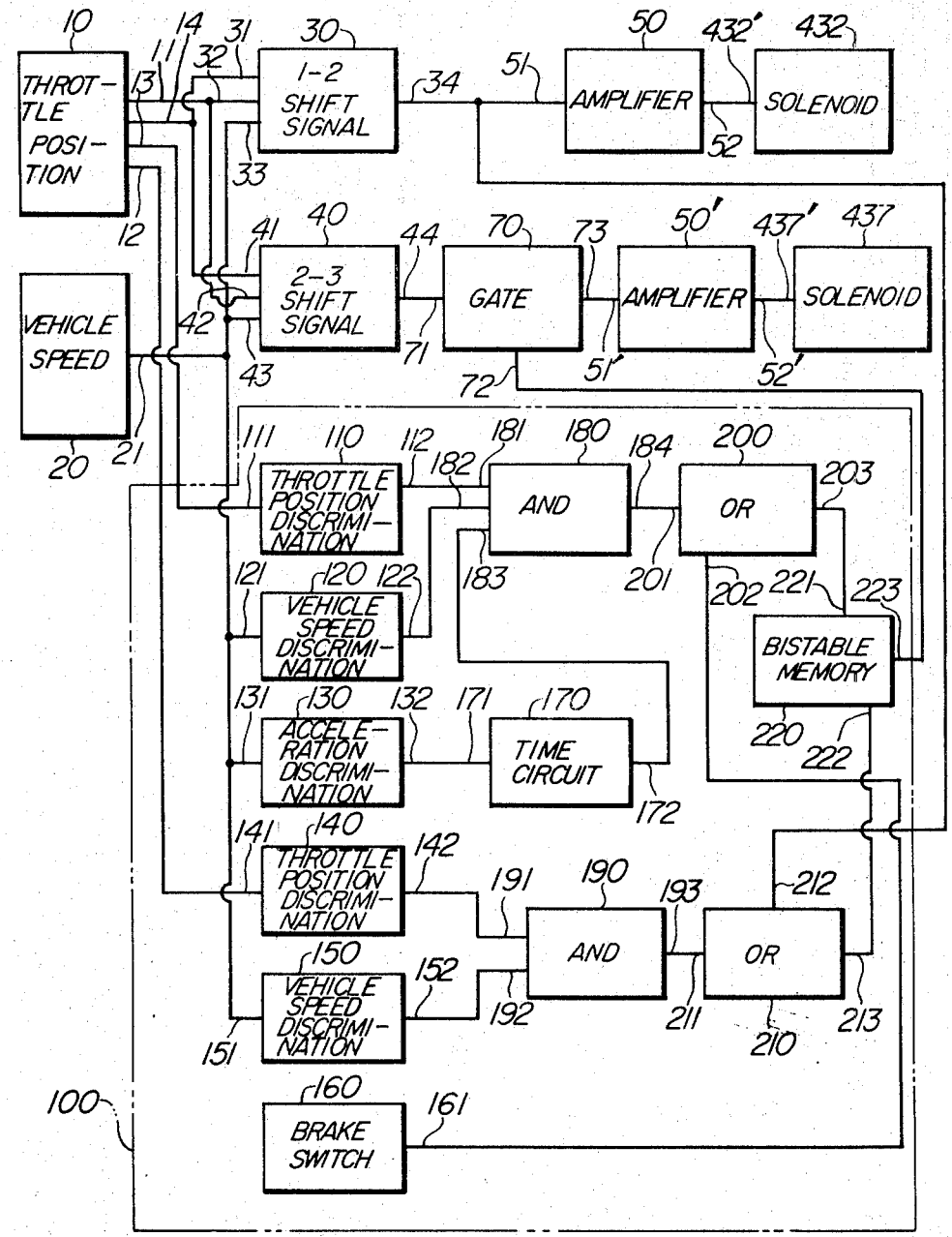
FIG. 6 is a block diagram of an automatic shift control system embodying the present invention.

Referring to a block diagram shown in FIG. 6, a shift signal control system according to the present invention includes a throttle position responsive circuit 10 generating a signal representative of the throttle position, a vehicle speed detecting circuit 20 generating a voltage proportional to the vehicle speed, a 1–2 shift signal generator 30 generating a signal for attaining a shift from the first to second speed, a 2–3 shift signal generator 40 generating a signal for attaining a shift from the second to third speed, amplifiers 50 and 50' of the same structure connected to the respective solenoids 432 and 437 disposed in the hydraulic actuating circuit shown in FIGS. 3 to 5, and a mountainous area circuit 100. The mountainous area circuit 100 includes a first throttle position discriminating circuit 110 generating a signal when the throttle position exceeds 2/4 of the full throttle opening, a second throttle position discriminating circuit 140 generating a signal when the throttle position exceeds 1/4 of the full throttle opening, a first vehicle speed discriminating circuit 120 generating a signal when the vehicle speed is decreased below 45 km/h, a second vehicle speed discriminating circuit 150 generating a signal when the vehicle speed exceeds 50 km/h, an acceleration discriminating circuit 130 generating a signal when the acceleration of the vehicle body is reduced below 0.05G, a brake switch circuit 160 generating a signal when the brake fluid pressure exceeds 15 kg/cm$^2$, a time circuit 170 generating a signal when an input signal remains applied to its input terminal for a period of time of more than 2 seconds, first and second AND circuits 180 and 190, first and second OR circuits 200 and 210, and a bistable memory circuit 220.

An output terminal 14 of the throttle position responsive circuit 10 is connected to an input terminal 31 of the 1–2 shift signal generator 30 and to an input terminal 41 of the 2–3 shift signal generator 40, while output terminals 12 and 13 of the throttle position responsive circuit 10 are connected to the input terminal 141 of the second throttle position discriminating circuit 140 and to the input terminal 111 of the first throttle position discriminating circuit 110, respectively. An output terminal 11 of the throttle position responsive circuit 10 is connected to an input terminal 32 of the 1–2 shift signal generator 30 and to an input terminal 42 of the 2–3 shift signal generator 40. The output terminal 21 of the vehicle speed detecting circuit 20 is connected to an input terminal 33 of the 1–2 shift signal generator 30 and to an input terminal 43 of the 2–3 shift signal generator 40. This output terminal 21 is further connected to the input terminal 121 of the first vehicle speed discriminating circuit 120, to the input terminal 151 of the second vehicle speed discriminating circuit 150, and to the input terminal 131 of the acceleration discriminating circuit 130 in the mountainous area circuit 100. The output terminal 34 of the 1–2 shift signal generator 30 is connected to the input terminal 51 of the amplifier 50 and to one of the input terminals 212 of the second OR circuit 210. The output terminal 52 of the amplifier 50 is connected to the input terminal 432' of the solenoid 432. The output terminal 44 of the 2–3 shift signal generator 40 is connected to the input terminal 71 of a gate 70, and the other input terminal 72 of the gate 70 is connected to the output terminal 223 of the bistable memory circuit 220. The output terminal 73 of the gate 70 is connected to the input terminal 51' of the amplifier 50', and the output terminal 52' of the amplifier 50' is connected to the input terminal 437' of the solenoid 437. In the mountainous area circuit 100, three input terminals 181, 182 and 183 of the first AND circuit 180 are connected to the output terminal 112 of the first throttle position discriminating circuit 110, to the output terminal 122 of the first vehicle speed discriminating circuit 120, and to the output terminal 172 of the time circuit 170, respectively. The input terminal 171 of the time circuit 170 is connected to the output terminal 132 of the acceleration discriminating circuit 130. Two input terminals 201 and 202 of the first OR circuit 200 are connected to the output terminal 184 of the first AND circuit 180 and to the output terminal 161 of the brake switch circuit 160, respectively. Two input terminals 191 and 192 of the second AND circuit 190 are connected to the output terminal 142 of the second throttle position discriminating circuit 140 and to the output terminal 152 of the second vehicle speed discriminating circuit 150, respectively. The other input terminal 211 of the second OR circuit 210 is connected to the output terminal 193 of the second AND circuit 190. Two input terminals 221 and 222 of the bistable memory circuit 220 are connected to the output terminal 203 of the first OR circuit 200 and to the output terminal 213 of the second OR circuit 210, respectively. The power supply, power supply circuit and power supply lines for these circuit elements are not shown in FIG. 6.

Figure 7:
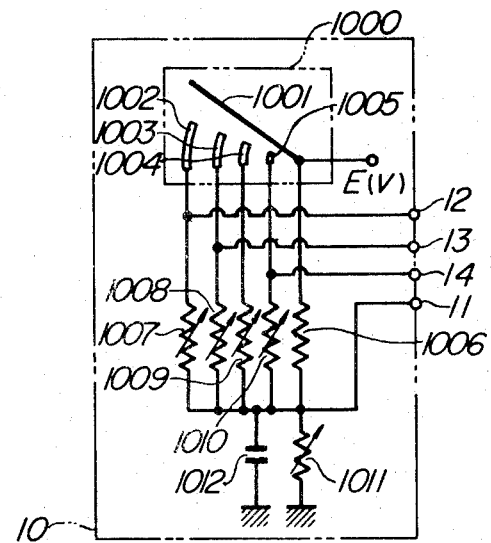
FIG. 7 is a circuit diagram showing the structure of a throttle position responsive circuit preferably used in the system shown in FIG. 6.

The throttle position responsive circuit 10 has a structure as shown in FIG. 7. Referring to FIG. 7, the reference numeral 1000 designates a multi-contact switch which is responsive to the degree of depression of the accelerator pedal so that, as the accelerator pedal is progressively depressed to increase the throttle opening, a movable contact 1001 is successively brought into contact with a plurality of stationary contacts 1002, 1003, 1004 and 1005. Thus, in the full opened throttle position, the movable contact 1001 engages all the stationary contacts 1002, 1003, 1004 and 1005. It is so arranged that the movable contact 1001 engages the stationary contacts 1002, 1003, 1004 and 1005 at the respective throttle openings of 1/4, 2/4, 2.5/4 and 3.5/4. In this case, 4/4 is the full throttle opening. A constant voltage of E volts is applied to the movable contact 1001. The stationary contacts 1002, 1003 and 1005 are connected to the respective output terminals 12, 13 and 14 of the throttle position responsive circuit 10. The stationary contact 1005 is engaged by the movable contact 1001 when the accelerator pedal is depressed. A resistor 1006 and variable resistors 1007, 1008, 1009 and 1010 are connected at one end to the movable contact 1001 and the stationary contacts 1002, 1003, 1004 and 1005, respectively, and at the other end in common to one end of a variable resistor 1011. This common junction point is connected to the output terminal 11 of the throttle position responsive circuit 10. The variable resistor 1011 is grounded at the other end thereof and a capacitor 1012 is connected in parallel with the variable resistor 1011. The variable resistor 1011 is so adjusted that an output voltage of $E_1$ volts appears at the output terminal 11 of the throttle position responsive circuit 10 when the movable contact 1001 is out of contact with any one of the stationary circuits 1002, 1003, 1004 and 1005. The variable resistor 1007 is so adjusted that an output voltage of $E_2$ volts appears at the output terminal 11 when the movable contact 1001 is brought into contact with the stationary contact 1002. The variable resistor 1008 is so adjusted that an output voltage of $E_3$ volts appears at the output terminal 11 when the movable contact 1001 is brought into contact with the stationary contact 1003 in addition to the previous contact with the stationary contact 1002. The variable resistor 1009 is so adjusted that an output voltage of $E_4$ volts appears at the output terminal 11 when the movable contact 1001 is brought into contact with the stationary contact 1004 in addition to the previous contact with the stationary contacts 1002 and 1003. The variable resistor 1010 is so adjusted that an output voltage of $E_5$ volts appears at the output terminal 11 when the movable contact 1001 is brought into contact with the stationary contact 1005 in addition to the previous contact with the stationary contacts 1002, 1003 and 1004. It will be also apparent that a signal of E volts appears at the output terminal 12 when the movable contact 1001 is in contact with the stationary contact 1002, at the output terminals 12 and 13 when the movable contact 1001 is in contact with the stationary contact 1003, and at the output terminals 12, 13 and 14 when the movable contact 1001 is in contact with the stationary contact 1005. The vehicle speed detecting circuit 20 is composed of an a.c. generator mounted at the outlet for the speedometer cable or in the transmission housing to generate an a.c. voltage proportional to the vehicle speed and a digital-analog converter for converting the output frequency of the a.c. generator into a corresponding voltage, and the output from the digital-analog converter appears at the output terminal 21.

Figure 8:
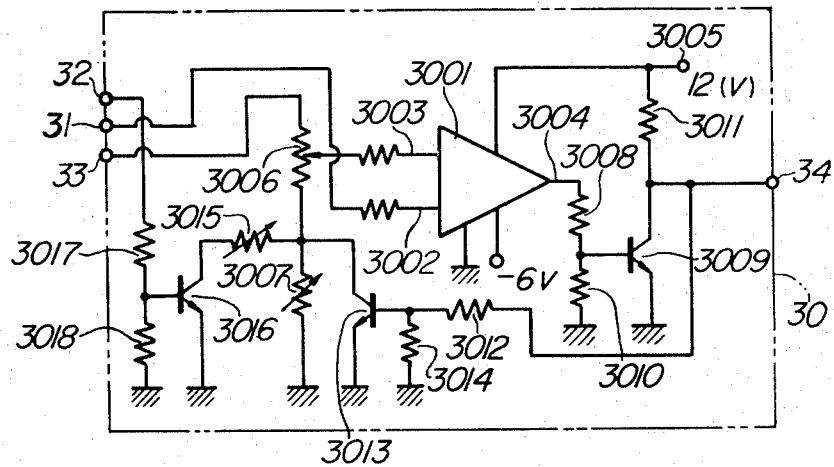
FIG. 8 is a circuit diagram showing the structure of a 1—2 shift signal generator preferably used in the system shown in FIG. 6.

The 1–2 shift signal generator 30 and the 2–3 shift signal generator 40 have the same structure, and therefore, the structure of the 1–2 shift signal generator 30 is only shown in FIG. 8, for the purpose of illustration. Referring to FIG. 8, the 1–2 shift signal generator 30 includes a comparison amplifier 3001 having two input terminals 3002 and 3003 and one output terminal 3004. One input terminal 3002 of the comparison amplifier 3001 is connected to the input terminal 32 of the 1–2 shift signal generator 30 through a resistor, while the other input terminal 3003 is connected to the variable terminal of a variable resistor 3006 through a resistor. One of the fixed terminals of the variable resistor 3006 is connected to the input terminal 33 of the 1–2 shift signal generator 30, while the other fixed terminal is connected to one end of the variable resistor 3007 which is grounded at the other end. The output terminal 3004 of the comparison amplifier 3001 is connected to the base of a transistor 3009 through a resistor 3008, and a resistor 3010 is connected between the base of the transistor 3009 and ground. The emitter of the transistor 3009 is grounded. The collector of the transistor 3009 is connected through a resistor 3011 to a power supply terminal 3005 connected to a power supply of E volts. The collector of the transistor 3009 is further connected to the output terminal 34 of the 1–2 shift signal generator 30, and to the base of a transistor 3013 through a resistor 3012. A resistor 3014 is connected between the base of the transistor 3013 and ground, and the emitter of the transistor 3013 is grounded. The collector of the transistor 3013 is connected to the junction point of the variable resistors 3006 and 3007. A variable resistor 3015 is connected at one end to the junction point of the variable resistors 3006 and 3007, and at the other end to the collector of a transistor 3016. The transistor 3016 has its emitter grounded and its base connected to the input terminal 31 of the 1–2 shift signal generator 30 through a resistor 3017. A resistor 3018 is connected between the base of the transistor 3016 and ground.

In operation, a voltage of approximately zero volts appears at the output terminal 3004 of the comparison amplifier 3001 when the voltage at the input terminal 3002 is higher than the voltage at the input terminal 3003. As a result, the transistor 3009 is cut off and the transistor 3013 conducts. Suppose that a voltage of $E_1$ volts corresponding to a throttle opening of 0/4 to 1/4 is applied to the input terminal 31 of the 1–2 shift signal generator 30 from the throttle position responsive circuit 10. The voltage $E_s$ appearing at the output terminal 21 of the vehicle speed detecting circuit 20 is increased with the increase in the vehicle speed, and this increased voltage $E_s$ is applied to the input terminal 33 of the 1–2 shift signal generator 30. In this case, a voltage of $k_1 E_s$ ($k_1 \leq 1$) is applied to the input terminal 3003 of the comparison amplifier 3001. A vehicle speed giving the relation $E_1 = K_1 E_s$ can be suitably selected since $k_1$ is freely variable by adjusting the variable resistor 3006. As the vehicle speed is further increased to attain the relation $E_1 \leq k_1 E_{s1}$, a voltage appears at the output terminal 3004 of the comparison amplifier 3001. Hereinafter, the symbols "1" and "0" are used to designate the appearance and non-appearance of a signal respectively, and the appearance of a signal "0" implies that "no signal appears." In response to the appearance of a signal "1" at the output terminal 3004 of the comparison amplifier 3001, the transistor 3009 conducts and no signal appears at the output terminal 34 of the 1–2 shift signal generator 30. The transistor 3013 is cut off due to the conduction of the transistor 3009. As a result, the voltage appearing at the input terminal 3003 of the comparison amplifier 3001 is increased by $\Delta E_{s1}$ corresponding to the associated resistance of the variable resistor 3007. Thus, even when the vehicle speed is subsequently decreased to the extent that the relation $E_1 = k_1 E_{s1}$ is reached again, "0" does not appear at the output terminal 3004 of the comparison amplifier 3001 until the relation $E_1 \geq k_1 E_{s1} - \Delta E_{s1}$ is attained. This fraction $\Delta E_{s1}$ represents a deviation of the 2–1 downshift point from the 1–2 upshift point and is generally called hysteresis. The degree of hysteresis can be freely selected by adjusting the variable resistor 3007. Then, when the throttle opening is increased to within the range of 1/4 to 2/4, due to the further depression of the accelerator pedal by the driver, $E_2$ volts is applied to the input terminal 31 of the 1-2 shift signal generator 30 from the throttle position responsive circuit 10. In this case, a shift from the first to second speed takes place when $E_2 \leq k_1 E_{s2}$ and a shift from the second to first speed takes place when $E_2 \geq k_1 E_{s2} - \Delta E_{s2}$. In response to the further depression of the accelerator pedal to bring the throttle opening in the range of 2/4 to 2.5/4, $E_3$ volts is applied to the input terminal 31 of the 1-2 shift signal generator 30 from the throttle position responsive circuit 10. In this case, a shift from the first to second speed takes place when $E_3 \leq k_1 E_{s3}$ and a shift from the second to first speed takes place when $E_3 \geq k_1 E_{s3} - \Delta E_{s3}$. As the accelerator pedal is further depressed to bring the throttle opening in the range of 2.5/4 to 3.5/4, $E_4$ volts is applied to the input terminal 31 of the 1-2 shift signal generator 30 from the throttle position responsive circuit 10. In this case, a shift from the first to second speed takes place when $E_4 \leq k_1 E_{s4}$ and a shift from the second to first speed takes place when $E_4 \geq k_1 E_{s4} - \Delta E_{s4}$. In response to the further depression of the accelerator pedal to attain the throttle opening of 3.5/4 to 4/4, $E_5$ volts is applied to the input terminal 31 of the 1-2 shift signal generator 30 from the throttle position responsive circuit 10. In this case, a shift from the first to second speed takes place when when $E_5 \leq K_l E_{s5}$ and, conversely, a shift from the second to first speed takes place when $E_5 \geq K_l E_{s5} - \Delta E_{s5}$.

Figure 9:
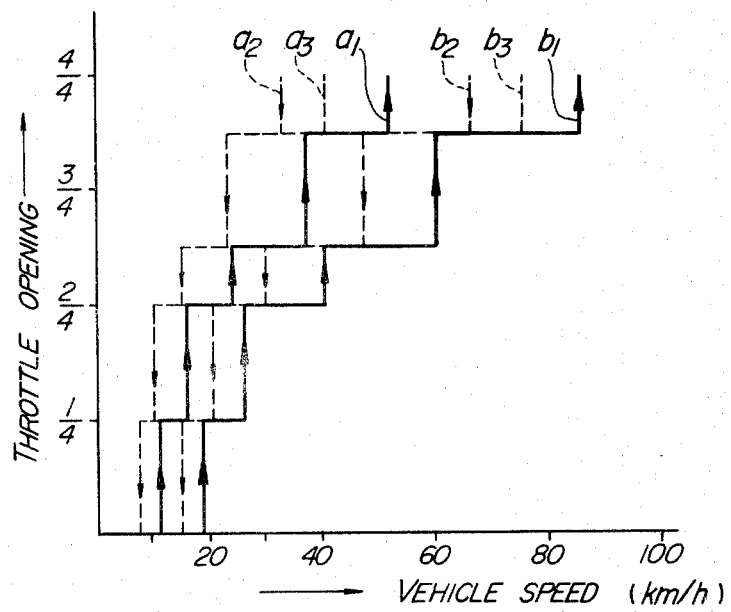
FIG. 9 is a graph showing the shift pattern according to the system of the present invention.

The above operation is shown graphically in FIG. 9 in which the horizontal and vertical axes represent the vehicle speed and the throttle position, respectively. The symbols $a_1$ and $a_2$ designate the point (line) at which an upshift from the first to second speed takes place and the point (line) at which a downshift from the second to first speed takes place, respectively. Similarly, by suitably regulating the components of the 2-3 shift signal generator 40, an upshift from the second to third speed and a downshift from the third to second speed takes place at a point (line) $b_1$ and a point (line) $b_2$, respectively, as shown in FIG. 9. When the throttle opening lies in the range of 3.5/4 to 4/4, voltage is applied to the input terminal 32 of the 1-2 shift signal generator 30 to urge the transistor 3016 to conduct so that the degree of the hysteresis can be made less than when the transistor 3013 is cut off. This reduction in the degree of hysteresis can be attained by suitably adjusting the variable resistor 3015. The symbols $a_3$ and $b_3$ in FIG. 9 designate such points (lines) in the case of a 1-2 shift and a 2-3 shift, respectively. These points (lines) $a_3$ and $b_3$ are called the kick-down shift points (lines) provided for the purpose of abruptly accelerating the vehicle by downshifting the gear by depressing the accelerator pedal to attain the throttle opening of more than 3.5/4 where abrupt acceleration is required during driving.

The amplifiers 50 and 50' are provided for driving the respective solenoids 432 and 437 and have the same structure. When a signal appears at the input terminals 51 and 51' of the amplifiers 50 and 50' no output appears at their output terminals 52 and 52' and the current supplied to the solenoids 432 and 437 is interrupted so that the solenoids 432 and 437 cease to attract the plungers. The hydraulic actuating circuit previously described is operative to shift the gear unit in the torque converter transmission to the first gear position, second gear position and third gear position in response to the de-energization of both the solenoids 432 and 437, in response to the energization of the solenoid 432 and the de-energization of the solenoid 437, and in response to the energization of both the solenoids 432 and 437, respectively.

Figure 10:
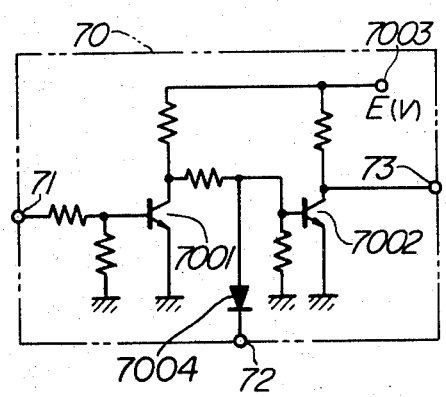
FIG. 10 is a circuit diagram showing the structure of a gate preferably used in the system shown in FIG. 6.

The gate 70 is opened in response to the application of a signal "1" from the mountainous area circuit 100. The gate 70 has a structure as shown in FIG. 10. Upon opening of the gate 70, when a signal "1" appears at the input terminal 71 of the gate 70, a transistor 7001 conducts and a transistor 7002 is cut off with the result that a signal "1" appears at the output terminal 73, but when, conversely, no signal appears at the input terminal 71, the transistor 7001 is cut off and the transistor 7002 conducts with the result that no signal appears at the output terminal 73. However, in spite of the application of a signal "1" or not to the input terminal 71, the application of no signal to the input terminal 72 results in the cut-off of the transistor 7002 as the base of the transistor 7002 is grounded through a diode 7004 and the gate 70 is closed so that a signal "1" appears at the output terminal 73. Thus, the application of no signal to the input terminal 72 of the gate 70 in the state in which the vehicle is driven in third gear due to the energization of the solenoids 432 and 437 results in the de-energization of the solenoid 437 thereby downshifting the gear to second gear. In an alternative arrangement for downshifting the gear from third to second gear, the output from the mountainous area circuit 100 may be applied to the vehicle speed responsive signal input terminal of the comparison amplifier in the 2-3 shift signal generator 40 to actuate the transistor switching circuit and the vehicle speed responsive signal may be prevented from being applied to the input terminal of the comparison amplifier in the 2-3 shift signal generator 40 thereby preventing the appearance of no signal at the output terminal 44 of the 2-3 shift signal generator 40.

It will be understood from the above description that an automatic shift during driving of the vehicle on a level road can be carried out by the combined operation of the throttle position responsive circuit 10, vehicle speed detecting circuit 20, 1-2 shift signal generator 30, 2-3 shift signal generator 40, amplifiers 50 and 50', and solenoids 432 and 437.

Figure 11:
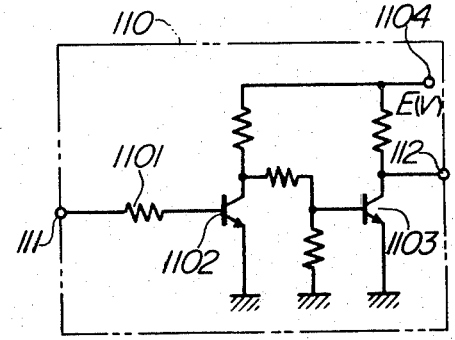
FIG. 11 is a circuit diagram showing the structure of a throttle position discriminating circuit preferably used in the system shown in FIG. 6.

The operation of the mountainous area circuit 100 will next be described. FIG. 11 shows the structure of the first throttle position discriminating circuit 110. Referring to FIG. 11, a resistor 1101 is connected at one end to the input terminal 111 and at the other end to the base of a transistor 1102 whose emitter is grounded. The collector of the transistor 1102 is connected to a power supply terminal 1104 and to the base of a transistor 1103 through a resistor. The base of the transistor 1103 is grounded through a resistor. The transistor 1103 has its emitter grounded and its collector connected to the power supply terminal 1104 through a resistor and to the output terminal 112 directly.

In operation, a voltage is applied to the input terminal 111 when the throttle opening exceeds 2/4 due to the depression of the accelerator pedal by the driver. A current is supplied to the base of the transistor 1102 through the resistor 1101 to urge the transistor 1102 to conduct. As a result, the transistor 1103 is cut off and a signal "1" appears at the output terminal 112. On the other hand, no voltage is applied to the input terminal 111 when the throttle opening is less than 2/4. As a result, the transistor 1102 is cut off and the transistor 1103 conducts so that no signal appears at the output terminal 112. In this connection, one may consider that there is no need to provide the throttle position discriminating circuit 110 and the signal applied to the input terminal 111 may be directly transmitted to the output terminal 112 to appear as an output signal. This is possible in the case in which a voltage appears newly at the output terminal 13 of the throttle position responsive circuit 10, but it is impossible in the case in which voltage appears at the output terminal 13 since the signal is not a signal of zero volt due to the "floating state" of the terminal. Thus, the throttle position discriminating circuit 110 is absolutely necessary.

Figure 12:
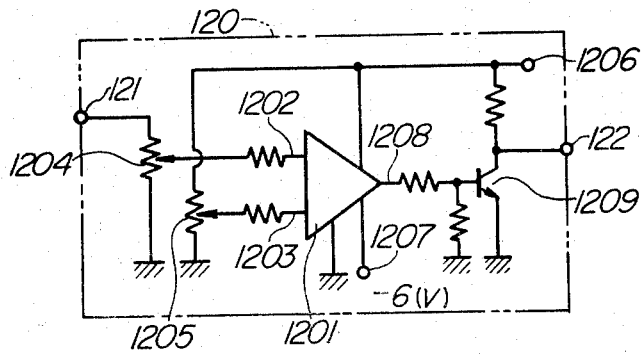
FIG. 12 is a circuit diagram showing the structure of a vehicle speed discriminating circuit preferably used in the system shown in FIG. 6.

The first vehicle speed discriminating circuit 120 has a structure as shown in FIG. 12. Referring to FIG. 12, one of the input terminals 1202 of a comparison amplifier 1201 is connected to the variable terminal of a variable resistor 1204 through a resistor. One of the fixed terminals of the variable resistor 1204 is connected to the input terminal 121 of the vehicle speed discriminating circuit 120, while the other fixed terminal is grounded. The other input terminal 1203 of the comparison amplifier 1201 is connected to the variable terminal of a variable resistor 1205 through a resistor. One of the fixed terminals of the variable resistor 1205 is connected to a power supply terminal 1206, while the other fixed terminal is grounded. A voltage of —6 volts is applied to a terminal 1207 of the comparison amplifier 1201 whose output terminal 1208 is connected to the base of a transistor 1209 through a resistor. The transistor 1209 has its base grounded through a resistor and its emitter also grounded. The collector of the transistor 1209 is connected to the power supply terminal 1206 through a resistor and to the output terminal 122 of the first vehicle speed discriminating circuit 120.

In operation, the variable resistor 1205 is suitably adjusted so that a voltage of $V_1$ volts appears at the input terminal 1203 of the comparison amplifier 1201. The variable resistor 1204 is so adjusted that a voltage of $V_1$ volts appears at the input terminal 1202 of the comparison amplifier 1201 when a d.c. voltage representative of the vehicle speed of 45 km/h is applied to the input terminal 121 of the vehicle speed discriminating circuit 120. Thus, at a vehicle speed below 45 km/h, no voltage or zero volts appears at the output terminal 1208 of the comparison amplifier 1201 and the transistor 1209 is cut off, but as soon as the vehicle speed attains 45 km/h, a voltage appears at the output terminal 1208 and the transistor 1209 conducts. Therefore, a signal "1" and no signal appear at the output terminal 122 of the vehicle speed discriminating circuit 120 when the vehicle speed is below and above 45 km/h, respectively.

Figure 13:
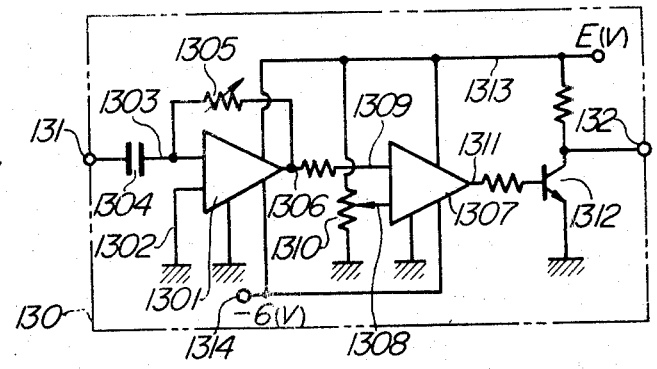
FIG. 13 is a circuit diagram showing the structure of a vehicle body acceleration discriminating circuit preferably used in the system shown in FIG. 6.

The structure of the acceleration discriminating circuit 130 is shown in FIG. 13. Referring to FIG. 13, one of the input terminals 1302 of an operational amplifier 1301 is grounded, while the other input terminal 1303 is connected to one terminal of a capacitor 1304. The other terminal of the capacitor 1304 is connected to the input terminal 131 of the acceleration discriminating circuit 130. The input terminal 1303 of the operational amplifier 1301 is also connected to one end of a variable resistor 1305, and the other end of the variable resistor 1305 is connected to the output terminal 1306 of the operational amplifier 1301. The capacitor 1304, the resistor 1305 and the operational amplifier 1301 constitute a differentiator well known in the art. The output terminal 1306 of the operational amplifier 1301 is connected to one of the input terminals 1309 of a comparison amplifier 1307 through a resistor. The other input terminal 1308 of the comparison amplifier 1307 is connected to the variable terminal of a variable resistor 1310. One of the fixed terminals of the variable resistor 1310 is connected to a power supply terminal 1313, while the other fixed terminal is grounded. The output terminal 1311 of the comparison amplifier 1307 is connected to the base of a transistor 1312 through a resistor. The transistor 1312 has its emitter grounded and its collector connected to the power supply terminal 1313 through a resistor. Further, the collector of the transistor 1312 is directly connected to the output terminal 132 of the acceleration discriminating circuit 130. A voltage of —6 volts is applied to a terminal 1314.

In operation, a d.c. voltage proportional to the vehicle speed is applied to the input terminal 131 of the acceleration discriminating circuit 130 from the vehicle speed detecting circuit 20. This voltage is differentiated by the differentiator composed of the capacitor 1304, variable resistor 1305 and operational amplifier 1301 so that a voltage representative of the acceleration appears at the output terminal 1306 of the operational amplifier 1301. The sensitivity to the acceleration is adjustable by the variable resistor 1305. The variable resistor 1308 is so adjusted that no signal appears at the output terminal 1311 of the comparison amplifier 1307 when a voltage representative of the acceleration of less than 0.05G is applied to the input terminal 1309 of the comparison amplifier 1307, while a signal "1" appears at the output terminal 1311 of the comparison amplifier 1307 when a voltage representative of the acceleration of more than 0.05G is applied to the input terminal 1309 of the comparison amplifier 1307. In response to the appearance of a signal "1" and no signal at the output terminal 1311 of the comparison amplifier 1307, the transistor 1312 conducts and is cut off, respectively. Consequently, a signal "1" and no signal appear at the output terminal 132 of the acceleration discriminating circuit 130 when the acceleration of the vehicle body is less than and more than 0.05G, respectively.

The second throttle position discriminating circuit 140 has a structure entirely the same as that of the first throttle position discriminating circuit 120 and is operative so that a signal "1" appears at its output terminal 142 when the throttle opening exceeds 1/4.

The second vehicle speed discriminating circuit 150 is generally similar to the first vehicle speed discriminating circuit 120 except that a phase inverter is connected to the output terminal 122 of the latter. The second vehicle speed discriminating circuit 150 is operative so that no signal and a signal "1" appear at its output terminal 152 when the vehicle speed is lower than and higher than 50 km/h, respectively.

The brake switch circuit 160 is composed of a diaphragm and a switch. When the fluid pressure applied to the brake is lower than 15 kg/cm², the switch is in its open position and no voltage appears at its output terminal 161, while when the fluid pressure is higher than 15 kg/cm², the switch is urged to its closed position and a voltage appears at the output terminal 161.

Figure 14:
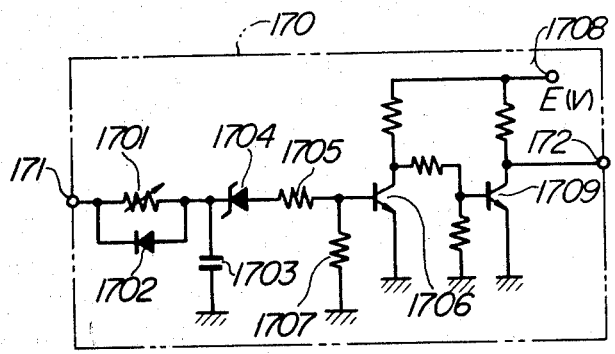
FIG. 14 is a circuit diagram showing the structure of a time circuit preferably used in the system shown in FIG. 6.

The structure of the time circuit 170 is shown in FIG. 14. Referring to FIG. 14, a variable resistor 1701 is connected at one end to the input terminal 171 of the time circuit 170 and at the other end to the positive electrode of a capacitor 1703. A diode 1702 has its cathode connected to the input terminal 171 and its anode connected to the positive electrode of the capacitor 1703. The negative electrode of the capacitor 1703 is grounded and the positive electrode thereof is also connected to the base of a transistor 1706 through a Zener diode 1704 and a resistor 1705. A resistor 1707 is connected between the base of the transistor 1706 and ground, and the emitter of the transistor 1706 is grounded. The collector of the transistor 1706 is connected to a power supply terminal 1708 through a resistor and to the base of a transistor 1709 through a resistor. A resistor is connected between the base of the transistor 1709 and ground. The collector of the transistor 1709 is connected to the power supply terminal 1708 through a resistor and to the output terminal 172 of the time circuit 170 directly.

In operation, the capacitor 1703 is charged through the variable resistor 1701 in response to application of a signal "1" to the input terminal 171 of the time circuit 170. As the voltage of the capacitor 1703 is gradually increased until it is higher than the Zener voltage of the Zener diode 1704, current flows across the base and emitter of the transistor 1706 through the resistor 1705 and the transistor 1706 conducts. As a result, the transistor 1709 is cut off and a signal "1" appears at the output terminal 172 of the time circuit 170. The period of time required until the voltage of the capacitor 1703 becomes equal to the Zener voltage of the Zener diode 1704 after the application of a signal "1" to the input terminal 171 is determined by the time constant of the combination of the variable resistor 1701 and the capacitor 1703 and is set at 2 seconds in the illustrated example. The charge stored in the capacitor 1703 is discharged through the diode 1702 as soon as the signal applied to the input terminal 171 is turned from a signal "1" to none. As a result, the transistor 1706 is cut off, while the transistor 1709 conducts, and "0" appears at the output terminal 172 of the time circuit 170. It will thus be seen that the time circuit 170 delivers a signal "1" at its output terminal 172 with a delay of 2 seconds after a signal "1" is applied to the input terminal 171, while it delivers no signal at its output terminal 172 when no signal is applied to the input terminal 171. Naturally, no signal appears at the output terminal 172 when no signal is applied to the input terminal 171 within 2 seconds after the application of a signal "1" to the input terminal 171.

Figure 15:
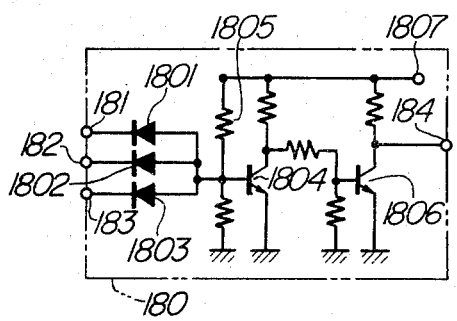
FIG. 15 is a circuit diagram showing the structure of an AND circuit preferably used in the system shown in FIG. 6.

The first AND circuit 180 has a structure as shown in FIG. 15. Referring to FIG. 15, the cathodes of diodes 1801, 1802 and 1803 are connected to the respective input terminals 181, 182 and 183 of the AND circuit 180, while the anodes of these diodes are connected in common to the base of a transistor 1804. A resistor is connected between the base of the transistor 1804 and ground, while a resistor 1805 is connected between the base of the transistor 1804 and a power supply terminal 1807. The transistor 1804 has its emitter grounded and its collector connected to the power supply terminal 1807 through a resistor and to the base of another transistor 1806 through a resistor. A resistor is connected between the base of the transistor 1806 and ground, and the emitter of the transistor 1806 is grounded. The collector of the transistor 1806 is connected to the power supply terminal 1807 through a resistor and to the output terminal 184 of the AND circuit 180.

In operation, when no signal is applied to any one of the input terminals 181, 182 and 183 of the AND circuit 180, no current is supplied to the base of the transistor 1804 due to the fact that one of the diodes 1801, 1802 and 1803 is conducting. Thus, the transistor 1804 is cut off and the transistor 1806 conducts with the result that no signal appears at the output terminal 184 of the AND circuit 180. On the other hand, when a signal "1" is applied to all of the input terminals 181, 182 and 183, a current flows across the base and emitter of the transistor 1804 through the resistor 1805 so that the transistor 1804 conducts and the transistor 1806 is cut off with the result that a signal "1" appears at the output terminal 184. More precisely, a signal "1" appears at the output terminal 184 of the AND circuit 180 when the throttle opening is more than 2/4, the vehicle speed is lower than 45 km/h and the vehicle body acceleration of less than 0.05 G continues for a period of time of more than 2 seconds, while no signal appears at the output terminal 184 when even one of these conditions is not satisfied.

The second AND circuit 190 is generally similar in structure to the first AND circuit 180 except that it has two input terminals instead of three. Consequently, a signal "1" appears at the output terminal 193 of the AND circuit 190 when the throttle position is more than 1/4 and the vehicle speed is higher than 50 km/h, while no signal appears at the output terminal 193 when even one of these conditions is not satisfied.

Figure 16:
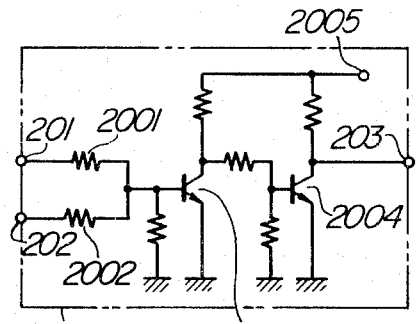
FIG. 16 is a circuit diagram showing the structure of an OR circuit preferably used in the system shown in FIG. 6.

The first OR circuit 200 has a structure as shown in FIG. 16. Referring to FIG. 16, resistors 2001 and 2002 are connected at one end to the respective input terminals 201 and 202 of the OR circuit 200, and at the other end in common to the base of a transistor 2003. A resistor is connected between the base of the transistor 2003 and ground. The transistor 2003 has its emitter grounded and its collector connected to a power supply terminal 2005 through a resistor and to the base of another transistor 2004 through a resistor. A resistor is connected between the base of the transistor 2004 and ground. The transistor 2004 has its emitter grounded and its collector connected to the power supply terminal 2005 through a resistor and to the output terminal 203 of the OR circuit 200.

In operation, when no signal is applied to all of the input terminals 201 and 202 of the OR circuit 200, the transistor 2003 is cut off and the transistor 2004 conducts with the result that no signal appears at the output terminal 203 of the OR circuit 200. On the other hand, when a signal "1" is applied to any one of or all of the input terminals 201 and 202, the transistor 2003 conducts and the transistor 2004 is cut off with the result that a signal "1" appears at the output terminal 203. More precisely, a signal "1" appears at the output terminal 203 of the OR circuit 200 when the throttle opening is more than 2/4, the vehicle speed is lower than 45 km/h and the vehicle body acceleration of 0.05G continues for a period of time of more than 2 seconds and/or the fluid pressure applied to the brake is higher than 15 kg/cm², while no signal appears at the output terminal 203 in any other case.

The second OR circuit 210 is the same in structure as the first OR circuit 200. Thus, a signal "1" appears at the output terminal 213 of the OR circuit 210 when the throttle opening is more than 1/4 and the vehicle speed is higher than 50 km/h and/or a signal "1" or first-speed signal appears at the output terminal 34 of the 1-2 shift signal generator 30, while no signal appears at the output terminal 213 in any other cases.

Figure 17:
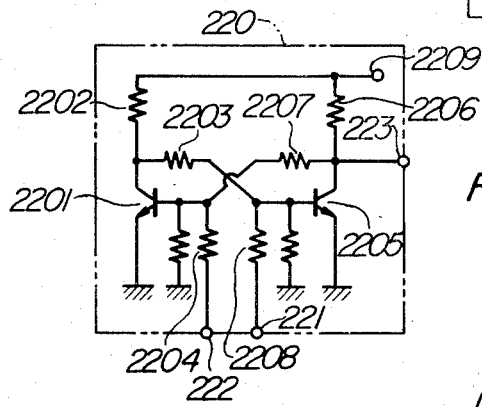
FIG. 17 is a circuit diagram showing the structure of a bistable memory circuit preferably used in the system shown in FIG. 6.

The bistable memory circuit 220 has a structure as shown in FIG. 17. Referring to FIG. 17, a resistor 2202 is connected between the collector of a transistor 2201 and a power supply terminal 2209, and a resistor 2203 is connected between the collector of the transistor 2201 and the base of another transistor 2205, while a resistor 2204 is connected between the base of the transistor 2201 and the input terminal 222 of the bistable memory circuit 220. Further, a resistor 2206 is connected between the collector of the transistor 2205 and the power supply terminal 2209, and a resistor 2207 is connected between the collector of the transistor 2205 and the base of the transistor 2201, while a resistor 2208 is connected between the base of the transistor 2205 and the input terminal 221. The collector of the transistor 2205 is connected directly to the output terminal 223 of the bistable memory circuit 220. A resistor is connected between the base of each of the transistors 2201 and 2205 and ground so as to stabilize the operation of these transistors.

In operation, when a signal "1" and no signal are applied to the respective input terminals 222 and 221 of the bistable memory circuit 220, the transistor 2201 conducts and the transistor 2205 is cut off with the result that a signal "1" appears at the output terminal 223. Then, when no signal is applied to the input terminal 222 and a signal "1" is applied to the input terminal 221, the transistor 2205 conducts and the transistor 2201 is cut off with the result that no signal appears at the output terminal 223. Therefore, no signal continues to appear at the output terminal 223 until a signal "1" is applied to the input terminal 222 after a signal "1" is applied to the input terminal 221. When a signal "1" appears at the output terminal 223, no input is applied to the input terminal 72 of the gate 70, and therefore, the same signal as that applied to the input terminal 71 continues to appear at the output terminal 73 of the gate 70. When, however, no signal appears at the output terminal 223 of the bistable memory circuit 220, zero potential appears at the input terminal 72 of the gate 70 and the transistor 7002 is cut off independently of whether the signal is applied to its input terminal 71 or not, with the result that a signal "1" appears at the output terminal 73 of the gate 70. Thus, the 2-3 shift solenoid 437 is de-energized to shift the gear to second gear even when the vehicle has been driving in third gear.

The operation of the system according to the present invention will be summarized. The vehicle can be driven on a level road while shifting the gears according to the shift pattern shown in FIG. 9. Suppose that the vehicle driven according to the shift pattern starts to go up an ascent. When the conditions that the throttle opening exceeds 2/4, the vehicle speed is reduced to less than 45 km/h and the vehicle body acceleration of less than 0.05G continues for more than 2 seconds, are met by the vehicle running up an ascent the gate 70 is closed to prevent the gear from upshifting to third gear from second or first gear or to downshift the gear from third gear to second or first gear when the vehicle has been driven in third gear so that the vehicle can go up an ascent in second or first gear. The vehicle may then encounter a decline. In such a case, the above conditions are maintained to drive the vehicle while applying engine braking. The accelerator pedal may be depressed when a slight acceleration is desired for the vehicle driven in such a state. When the throttle opening exceeds 1/4 and the vehicle speed is increased to more than 50 km/h, the bistable memory circuit 220 acts to open the gate 70 so that the vehicle can be driven while shifting gears according to the shift pattern shown by solid lines in FIG. 9. When the vehicle driven in third gear encounters a further descent and it is desired to downshift the gear from third gear to second or first gear for applying the engine braking, the conditions previously described, that is, a throttle opening of more than 2/4 with a vehicle speed of less than 45 km/h, and a continuation of the vehicle body acceleration of less than 0.05G for more than 2 seconds are not satisfied in such a case. However, when the fluid pressure applied to the brake becomes higher than 15 kg/cm² as the driver depresses the brake pedal, the brake switch circuit 160, first OR circuit 200 and bistable memory circuit 220 are operated in the above order thereby closing the gate 70 so that the gear can be downshifted to second or first gear to apply engine braking. Once the fluid pressure applied to the brake attains the value of more than 15 kg/cm², there is no need for further depression of the brake pedal due to the fact that the gate 70 is held closed by the bistable memory circuit 220.

Further, during driving of the vehicle on a level road in third gear, the brake pedal may be temporarily depressed to raise the brake fluid pressure above 15 kg/cm² so as to actuate the brake switch circuit 160 thereby downshifting the gear to second gear to apply engine braking. The gate 70 can be opened by increasing the throttle opening and vehicle speed above 1/4 and 50 km/h, respectively, or stopping the vehicle or downshifting the gear to first gear.

Figure 18:
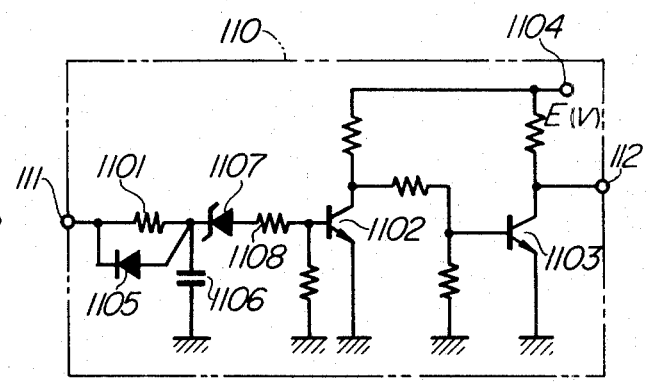
FIG. 18 is a circuit diagram of a modification of the throttle position discriminating circuit shown in FIG. 11.

The first throttle position discriminating circuit 110 may have a structure as shown in FIG. 18. Referring to FIG. 18, the throttle position discriminating circuit 110 has an input terminal 111, an output terminal 112, a resistor 1101, transistors 1102, and 1103, and a power supply terminal 1104 as in the case of FIG. 11. A discharging diode 1105 is connected in parallel with the resistor 1101. A signal or voltage applied to the input terminal 111 charges a capacitor 1106 through the resistor 1101. A Zener diode 1107 conducts when the voltage of the capacitor 1106 exceeds a predetermined value. A base resistor 1108 for the transistor 1102 is connected between the Zener diode 1107 and the base of the transistor 1102. With such a structure, no output signal appears at the output terminal 112 of the throttle position discriminating circuit 110 unless "1" is continuously applied to the input terminal 111 for more than a predetermined period of time. More precisely, a signal or voltage is applied to the input terminal 111 from the throttle position responsive circuit 10 when the throttle opening exceeds 2/4. The voltage charges the capacitor 1106 through the resistor 1101. When the voltage of the capacitor 1106 is increased to a value which is higher than the Zener voltage of the Zener diode 1107, current is supplied to the base of the transistor 1102 through the resistor 1108 so that the transistor 1102 conducts and the transistor 1103 is cut off. As a result, a signal "1" appears at the output terminal 112. The diode 1105 is operative to quickly discharge the capacitor 1106 in response to the application of no signal to the input terminal 111.

The throttle position discriminating circuit 110 having a structure as shown in FIG. 18 is advantageous in that the gear unit is prevented from being undesirably shifted to second gear and the danger due to a sudden shift can be avoided because no output signal appears at the output terminal 112 when the signal is applied to the input terminal 111 for a moment, that is, when it is desired to increase the throttle opening above 2/4 for a moment.

What is claimed is:

1. In an automatic transmission for an engine driven vehicle having
    a torque converter whose input shaft is connected with an output shaft of said engine,
    a gear unit connected with an output shaft of said torque converter,
    frictionally engaging means combined with said gear unit for accomplishing selective meshing engagement of gears in said gear unit, and
    drive means coupled to said frictionally engaging means for actuating said frictionally engaging means to shift gears,
    the improvement in an automatic shift control system comprising:
    first means for generating an electrical signal responsive to a load on said engine;
    second means for generating an electrical signal responsive to a vehicle speed;
    shift signal generation means including first and second shift signal generator means each of which is connected in circuit with each of said first and second means to generate a lower gear position responsive signal and to generate a higher gear position responsive signal, respectively, when the electrical signals from said first and second means satisfy predetermined conditions,
    two solenoid means connected in circuit with said first and second shift signal generator means, respectively, to generate output signals when the signal from said first and second shift signal generator means is respectively applied thereto, for applying said output signals to said drive means for actuating said frictionally engaging means,
    gate means between said second shift signal generator means and the respective solenoid means, and
    mountainous area circuit means including a brake fluid pressure detecting means for generating a signal representing a braking pressure,
    said mountainous area circuit means being connected in circuit with said first and second means and said first shift signal generator means and including means for applying a signal to said gate means so as to prevent said higher gear position responsive signal from being applied to said solenoid means when at least one of the conditions of the electrical signals from said first and second means and the condition of the output signal of said brake fluid pressure detecting means satisfies a first predetermined condition, and for ceasing to generate and apply said signal to said gate means so as to permit said higher gear position responsive signal to be applied to said solenoid means when at least the condition of the lower gear position responsive signal from said first shift signal generating means and the conditions of the signals from said first and second means satisfies a second predetermined condition.

2. An automatic shift control system for an automatic transmission as in claim 1, in which said mountainous area circuit means comprises
    a first throttle position discriminating circuit connected in circuit with said first means for generating a signal when the value of the electrical signal responsive to a load on the engine is larger than a preset value,
    a first vehicle speed discriminating circuit connected in circuit with said second means for generating a signal when the value of the electrical signal responsive to a vehicle speed is smaller than a preset value,
    a vehicle acceleration discriminating circuit connected in circuit with said second means for generating a signal when a differentiated value of the electric signal responsive to a vehicle speed is smaller than a preset value,
    a time circuit connected in circuit with said vehicle acceleration discriminating circuit for generating a signal when the signal generated by said vehicle acceleration discriminating circuit continues to appear for more than a predetermined period of time,
    a first AND circuit connected in circuit with said first throttle position discriminating circuit, said first vehicle speed discriminating circuit and said time circuit for generating a signal upon receipt of all the signals from said first throttle position discriminating circuit, from said first vehicle speed discriminating circuit and from said time circuit,
    a brake fluid pressure detecting circuit connected in circuit with said brake fluid pressure detecting means for generating a signal when the signal from said brake fluid pressure detecting means satisfies a predetermined condition,
    a first OR circuit connected in circuit with said first AND circuit and said brake fluid pressure detecting circuit for generating a signal upon receipt of at least one of the signals from said first AND circuit and from said brake fluid pressure detecting circuit,
    a second throttle position discriminating circuit connected in circuit with said first means for generating a signal when the vlaue of the electric signal responsive to a load on the engine is larger than another preset value, a second vehicle speed discriminating circuit connected in circuit with said second means for generating a signal when the value of the electric signal responsive to a vehicle speed is larger than another preset value, a second AND circuit connected in circuit with said throttle position discriminating circuit and said second vehicle speed discriminating circuit for generating a signal upon receipt of both signals from said second throttle position discriminating circuit and from said second vehicle speed discriminating circuit, a second OR circuit connected in circuit with said second AND circuit and said first shift signal generator means for generating a signal upon receipt of at least one of the signal from said second AND circuit and the lower gear position responsive signal from said first shift signal generator means, and a bistable memory circuit connected in circuit with said first and second OR circuits which is placed in one of two stable states thereof and continues to generate a signal upon receipt of the signal from said first OR circuit and which is placed in the other stable state thereof and ceases to generate said signal upon receipt of the signal from said second OR circuit.

3. An automatic shift control system for an automatic transmission as in claim 2, in which said first throttle position discriminating circuit is constructed to generate a signal when the value of the electrical signal responsive to a load on the engine continues to be larger than the preset value for more than a predetermined period of time.

* * * * *

UNITED STATES PATENT OFFICE
CERTIFICATE OF CORRECTION

Patent No. 3,684,066  Dated August 15, 1972

Inventor(s) Seitoku KUBO, et al

It is certified that error appears in the above-identified patent and that said Letters Patent are hereby corrected as shown below:

In the heading, under Assignees:

read "Toyota Jidasha Kogyo Kabushiki Kaisha" as
-- Toyota Jidosha Kogyo Kabushiki Kaisha --

Signed and sealed this 6th day of February 1973.

(SEAL)
Attest:

EDWARD M. FLETCHER, JR.  
Attesting Officer

ROBERT GOTTSCHALK  
Commissioner of Patents